(No Model.)
W. G. HIMROD.
SUBMERGED WATER FILTER FOR PURIFYING WATER.
No. 326,500. Patented Sept. 15, 1885.
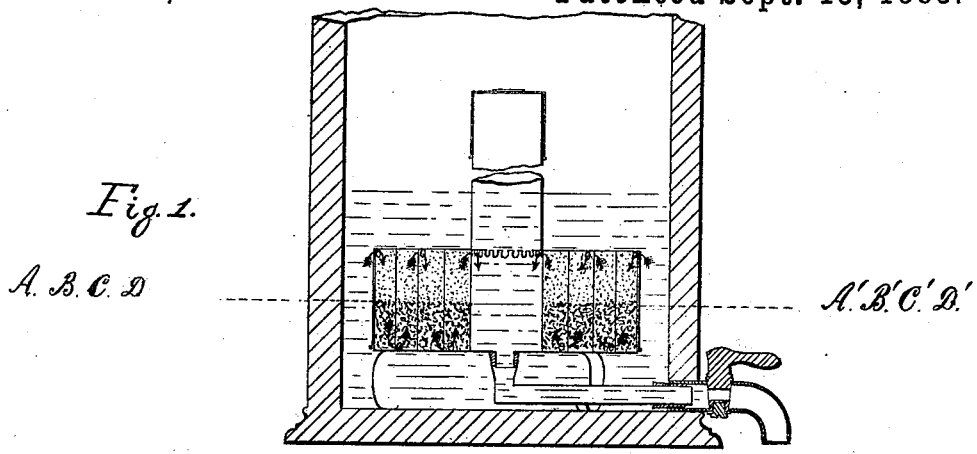
Fig. 1.
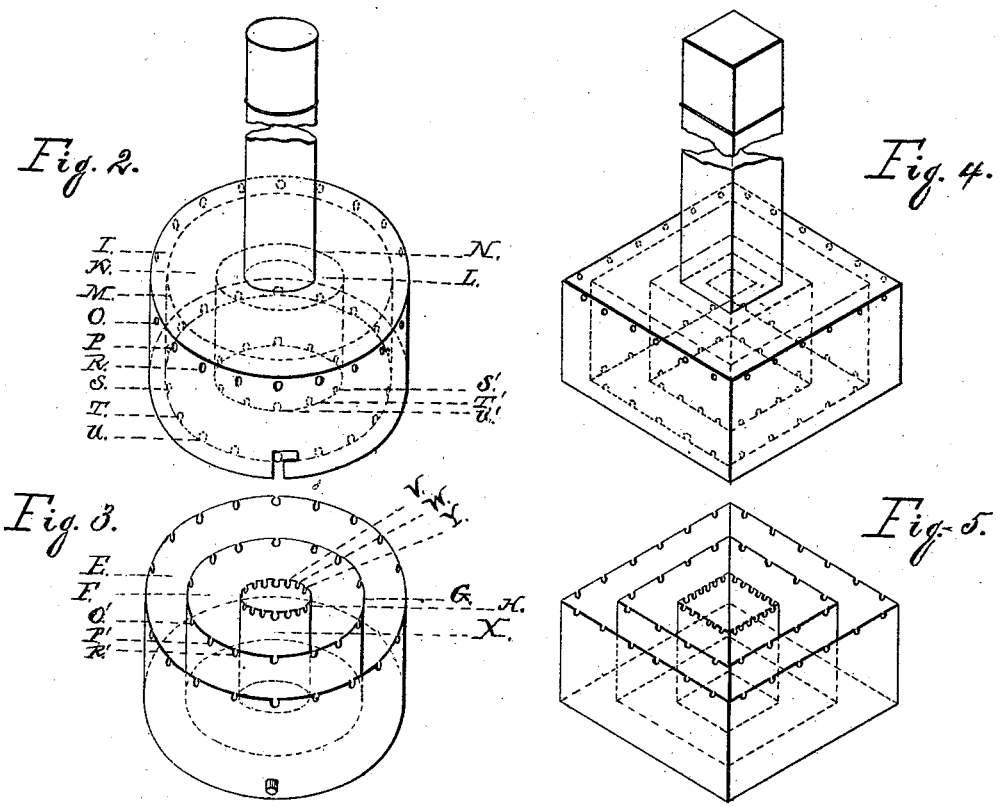
Fig. 2. Fig. 4.
Fig. 3. Fig. 5.
Witnesses.
Ralph Kauffman
C. K. Zug
Inventor.
William Gibson Himrod
per Wm. L. Nevin,
Attorney.

UNITED STATES PATENT OFFICE.

WILLIAM GIBSON HIMROD, OF PHILADELPHIA, PENNSYLVANIA.

SUBMERGED WATER-FILTER FOR PURIFYING WATER.

SPECIFICATION forming part of Letters Patent No. 326,500, dated September 15, 1885.

Application filed February 25, 1885. (No model.)

*To all whom it may concern:*

Be it known that I, WILLIAM GIBSON HIMROD, a citizen of the United States, residing at Philadelphia, in the county of Philadelphia and Commonwealth of Pennsylvania, have invented a new and Improved Submerged Water-Filter for Purifying Water; and I do hereby declare that the following is a full, clear, and exact description of the same, such as will enable others skilled in the art to which it appertains to make and use it, reference being had to the accompanying drawings, which form part of this specification.

This invention relates to that class of filters for domestic purposes containing purifying materials which are submerged in water, and which can be applied to tanks, water-coolers, refrigerators, &c.

Figure 1 in the drawings gives a sectional view of the filter after it is submerged in the water-cooler and is in position for operation. Fig. 2 represents the top section of the filter before it is placed in the cooler and after it is separated from or lifted off of the bottom, Fig. 3. Fig. 3 represents the bottom section of the filter before it is placed in the cooler and after it is separated from the top section, Fig. 2. Figs. 4 and 5 represent, respectively, the top and bottom sections of the filter made in a square form instead of a cylindrical one.

As seen in Figs. 2 and 3, the filter consists of a bottom, Fig. 3, and a top, Fig. 2, made of sheet metal in circular form, the former having a standing or upright partition, (marked G,) as seen in Fig. 3, substantially soldered in said bottom, with a diameter less than the diameter of the circular bottom in which it is so placed, by means of which partition the said bottom, as seen in Fig. 3, is divided into two chambers or compartments, (marked E and F, respectively.)

The top, Fig. 2, is likewise divided into the three chambers or compartments, (marked I, K, and L, respectively,) by means of the two depending partitions, (marked M and N, respectively,) as seen in Fig. 2, which partitions are also soldered in as aforesaid, the partition N being, however, of a less diameter than the partition M, and the latter having a less diameter than the diameter of the circular top in which it is so placed. The partitions M and N in one section, Fig. 2, therefore, arranged as aforesaid, being of a different diameter one of another, and of a different diameter than the partition G in the other section, Fig. 3, make the chambers or compartments, (marked A, B, C, and D, and A', B', C', and D', respectively,) as seen in Fig. 1. When the said sections, Figs. 2 and 3, are fitted together by placing Fig. 2 over Fig. 3, and then fastening the same by means of bayonet-clasps, which are upon either side of the circular bottom, Fig. 3, and which clasps, when in position, fit into corresponding cuts arranged for the same on either side of the circular top, Fig. 2, into which chambers or compartments the filtering material is packed, and through which the water in its tortuous course in passing from the outside into the reservoir, (marked X in Fig. 3,) as hereinafter described, is forced to pass through openings cut alternately in the top and bottom edges of the partitions separating the chambers or compartments arranged as aforesaid.

After the filter is submerged, as seen in Fig. 1, the impure water enters into the first chamber (marked A and A', Fig. 1) by means and through the small holes which surround the top of the filter, (marked O, P, and R, &c.,) as seen in Fig. 2, and passes through the filtering composition in said chamber or division in a downward direction until it reaches the bottom of said chamber or division, where it passes, by means of holes surrounding the bottom of the first tin partition, M, (marked S, T, and U, &c., respectively,) as seen in Fig. 2, into the second chamber or division, (marked B and B', Fig. 1,) where it passes in an upward direction through a like composition until it rises to the top of the filter at the second chamber or division, where it passes through, by means of holes surrounding the top of the second tin partition, G, Fig. 3, (marked O', P', and R', &c., respectively,) as seen in Fig. 3, into the third chamber or division, (marked C and C', Fig. 1,) where it passes in a downward course through a like composition until it reaches bottom of the said chamber or division, where it passes, by means of holes surrounding the bottom of the third tin partition, N, as seen in Fig. 2, (marked S', T', and U', &c., respectively, as seen in Fig. 2,) into the fourth chamber or division, D and D', Fig. 1, where it rises through a like composition until it reaches the top of said filter, where it passes into the reservoir, (marked X,) as seen in Fig. 3, (the outside of which reservoir is marked H, as seen in Fig. 3,) by means of the small holes surrounding the top of H, the side of said reservoir, as seen in Fig. 3, and marked V, W, and Y, respectively. The impure water thus entering the filter, as seen in Fig. 1, would enter each chamber or division in order, and percolating through said composition, as aforesaid, passing alternately through the top and bottom of each succeeding partition, arranged as aforesaid, would ultimately arrive at the reservoir in the center of the filter, (marked X,) as seen in Fig. 3. After the water is thus admitted to the reservoir (marked X) it is drawn off for use by means of the connecting-pipe, as seen in Fig. 1, which is joined to a small pipe extending from said reservoir by means of a gum washer, and extends into the faucet of the water cooler, tank, refrigerator, &c., in which said filter is submerged.

In arranging the filter for use the filtering material is merely packed in the chambers in the bottom, Fig. 3, after which the top, Fig. 2, is then pressed down upon it and fastened by means of the bayonet-clasps, substantially as shown and described, thus permitting the filter to be easily cleaned and refilled—a thing absolutely necessary for the perfect working of a filter—and allowing the same to be kept in a clean and wholesome state at all times with little care or expense.

What I claim as my invention, and desire to secure by Letters Patent, is—

In a water-filter, the combination of the two sections, Figs. 2 and 3, the former having depending partitions and the latter a standing or upright partition, the partitions in one section being of a different diameter from that in the other section, whereby when said sections are fitted together the partitions will alternate, as shown, and form chambers for the reception of filtering materials, and said partitions having, respectively, openings at their bottom and their top edges, whereby the water in traveling from the outside to the central compartment will be compelled to take a tortuous course, substantially as shown and set forth.

WILLIAM GIBSON HIMROD.

Witnesses:
BENJAMIN MILLER,
C. K. ZUG.